United States Patent
Kawashimo et al.

(10) Patent No.: US 9,628,856 B2
(45) Date of Patent: Apr. 18, 2017

(54) INFORMATION OUTPUT APPARATUS AND COMPUTER READABLE MEDIUM

(71) Applicant: CASIO COMPUTER CO., LTD., Shibuya-ku (JP)

(72) Inventors: Takashi Kawashimo, Fussa (JP); Gou Kawakami, Fussa (JP); Asami Aso, Kokubunji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/845,056

(22) Filed: Sep. 3, 2015

(65) Prior Publication Data

US 2016/0088349 A1 Mar. 24, 2016

(30) Foreign Application Priority Data

Sep. 18, 2014 (JP) ................................. 2014-190520

(51) Int. Cl.
*H04H 60/33* (2008.01)
*H04N 7/10* (2006.01)
(Continued)

(52) U.S. Cl.
CPC . *H04N 21/44218* (2013.01); *H04N 21/41415* (2013.01); *H04N 21/812* (2013.01)

(58) Field of Classification Search
CPC ....... H04N 21/41415; H04N 21/42201; H04N 21/42202; H04N 21/431
(Continued)

(56) References Cited

U.S. PATENT DOCUMENTS 7,715,448 B2* 5/2010 Cheng .................... H04L 67/20
370/476
2005/0220349 A1 10/2005 Furuya et al.
(Continued)

FOREIGN PATENT DOCUMENTS

CN      1518336      8/2004
CN      1577393      2/2005
(Continued)

OTHER PUBLICATIONS

Office Action dated Dec. 22, 2016 which issued in the corresponding Chinese Patent Application No. 201510595503.2.

*Primary Examiner* — Dominic D Saltarelli
(74) *Attorney, Agent, or Firm* — Cozen O'Connor

(57) ABSTRACT

An information output apparatus for displaying information such as advertisements increases viewers' attention. A plurality of advertisement videos (id=1, 2, . . . ) stored in an advertisement video storage area 22b are projected onto a display unit 12 from a projection device 13 and reproduced, according to the definition of advertisement video reproduction order stored in an advertisement video reproduction definition storage area 22c. Upon switching the reproduction of each advertisement video, from among a plurality of switching effect images EP . . . (ID=1, 2, . . . ) that are assigned ID numbers in descending order of noticeability against the surrounding environment, i.e. in descending order of the complementary color ratio, and stored in a switching effect image storage area 22e, an image ID associated with higher noticeability is set when the non-operation time (the time during which no person is detected around the apparatus body) from the advertisement video reproduction start is longer. This non-operation time is measured and stored in a non-operation time storage area
(Continued)

22*f*. The switching effect image EP corresponding to the image ID is then reproduced.

7 Claims, 10 Drawing Sheets

(51) Int. Cl.
*H04N 7/18* (2006.01)
*H04N 7/167* (2011.01)
*H04N 21/442* (2011.01)
*H04N 21/81* (2011.01)
*H04N 21/414* (2011.01)

(58) Field of Classification Search
USPC .......................................... 725/10, 12, 32, 74
See application file for complete search history.

(56) References Cited

U.S. PATENT DOCUMENTS

2009/0315869 A1   12/2009   Sugihara et al.
2010/0149399 A1    6/2010   Mukai et al.

FOREIGN PATENT DOCUMENTS

| CN | 101609660 | 12/2009 |
| CN | 101680766 | 3/2010 |
| JP | 2011-150221 | 8/2011 |

* cited by examiner 22g (SWITCHING EFFECT IMAGE SWITCHING DEFINITION FORMAT)

```
<switch>
<flag level=1>15</flag>
<flag level=2>30</flag>
<flag level=3>60</flag>
<flag level=4>120</flag>
<max_play>70<max_play>
</switch>
```

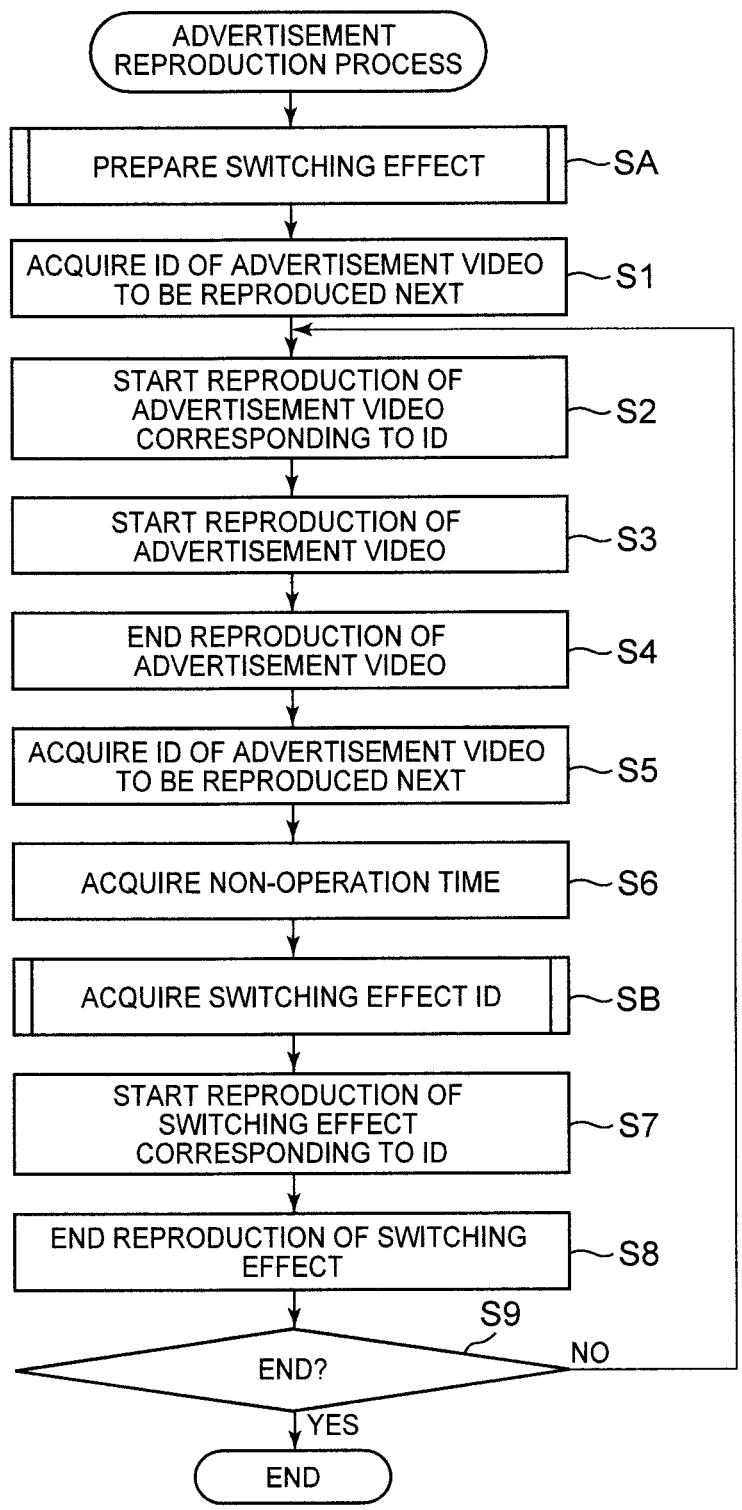

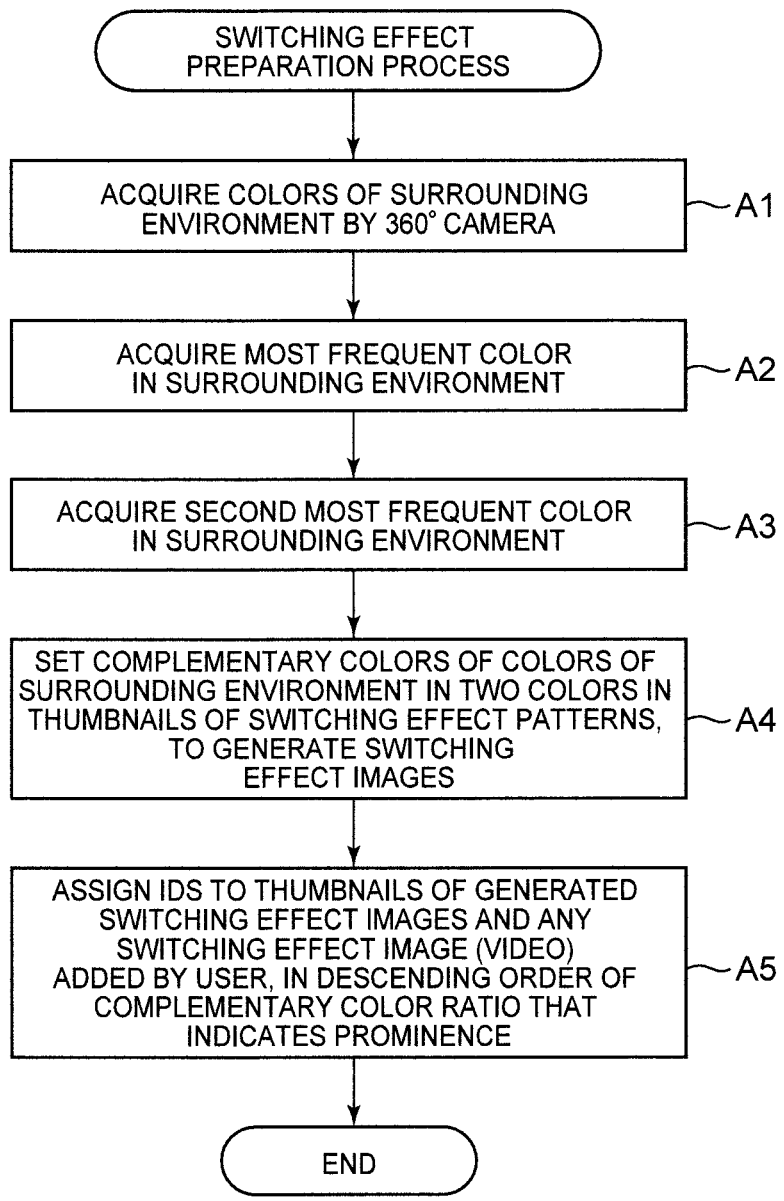

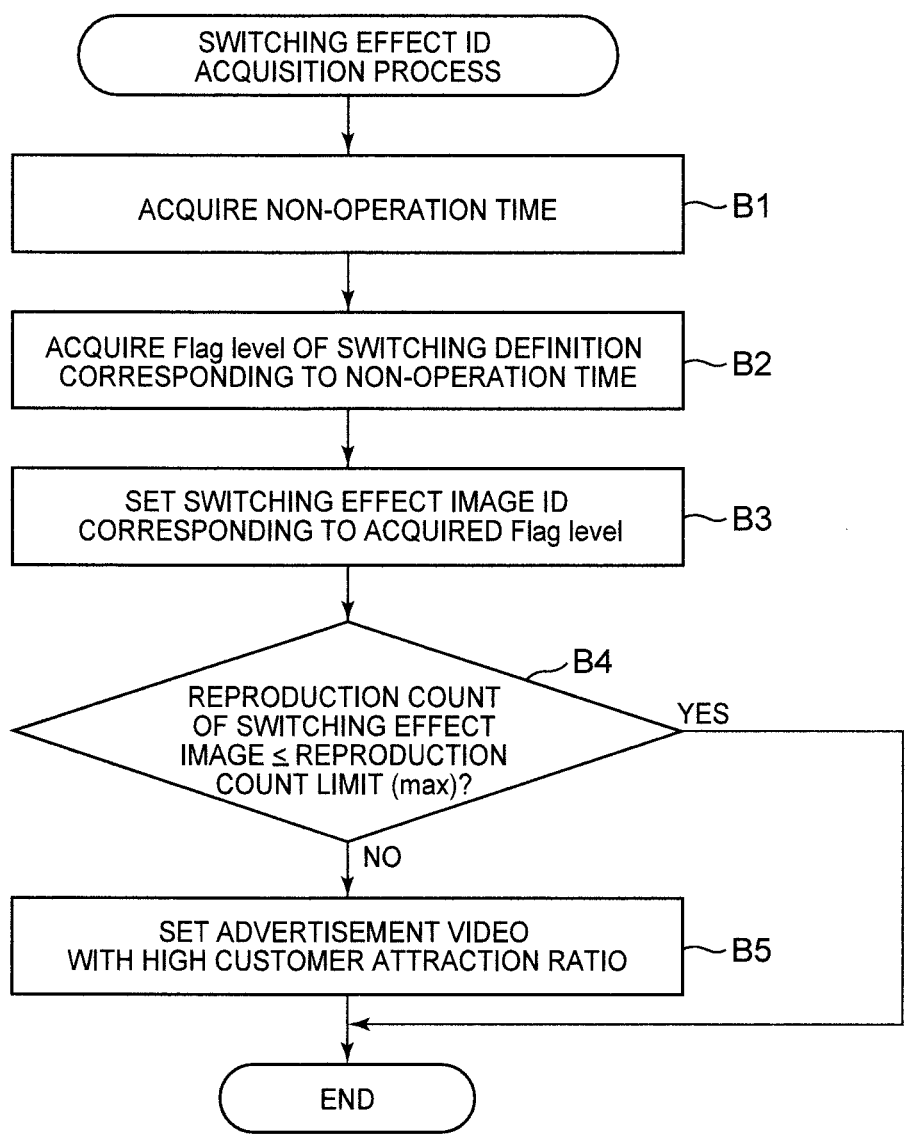

INFORMATION OUTPUT APPARATUS AND COMPUTER READABLE MEDIUM

BACKGROUND OF THE INVENTION

1. Field of the Invention

The present invention relates to an information output apparatus and a computer readable medium.

2. Description of the Related Art

Electronic advertisement apparatuses called digital signage have been widely used in recent years.

An electronic advertisement apparatus projects an advertisement image produced beforehand onto a screen in an exhibition hall, the entrance of a company office, a storefront, or the like, to convey information to people viewing the image.

For example, a conventional video output apparatus projects, onto a screen shaped in the contours of a person who appears in an advertisement, an advertisement image of the person speaking, thus enhancing viewers' impression (for example, see Patent Document 1).

[Patent Document 1] Japanese Patent Application Laid-Open No. 2011-150221

SUMMARY OF THE INVENTION

The conventional electronic advertisement apparatus merely outputs the advertisement video unilaterally.

The conventional video output apparatus can attract viewers' interest by projecting, onto the screen shaped in the contours of the person who appears in the advertisement, the advertisement image of the person, but cannot increase the viewers' attention once they have become accustomed to the image.

The present invention has been made in view of this problem, and has an object of increasing viewers' attention.

An information output apparatus according to the present invention includes: a content output unit configured to output content; a person state detection unit configured to detect a person presence state; and a control unit configured to control a content switching effect based on the person presence state detected by the person state detection unit, when switching the content output by the content output unit.

According to the present invention, it is possible to increase viewers' attention.

BRIEF DESCRIPTION OF THE SEVERAL VIEWS OF THE DRAWING

FIG. 7 is a flowchart illustrating an advertisement reproduction process by the electronic advertisement apparatus 10.

FIG. 8 is a flowchart illustrating the switching effect preparation process in the advertisement reproduction process by the electronic advertisement apparatus 10.

FIG. 9 is a flowchart illustrating the switching effect ID acquisition process in the advertisement reproduction process by the electronic advertisement apparatus 10.

DETAILED DESCRIPTION OF THE INVENTION

The following describes an embodiment of the present invention with reference to drawings.

Figure 1:
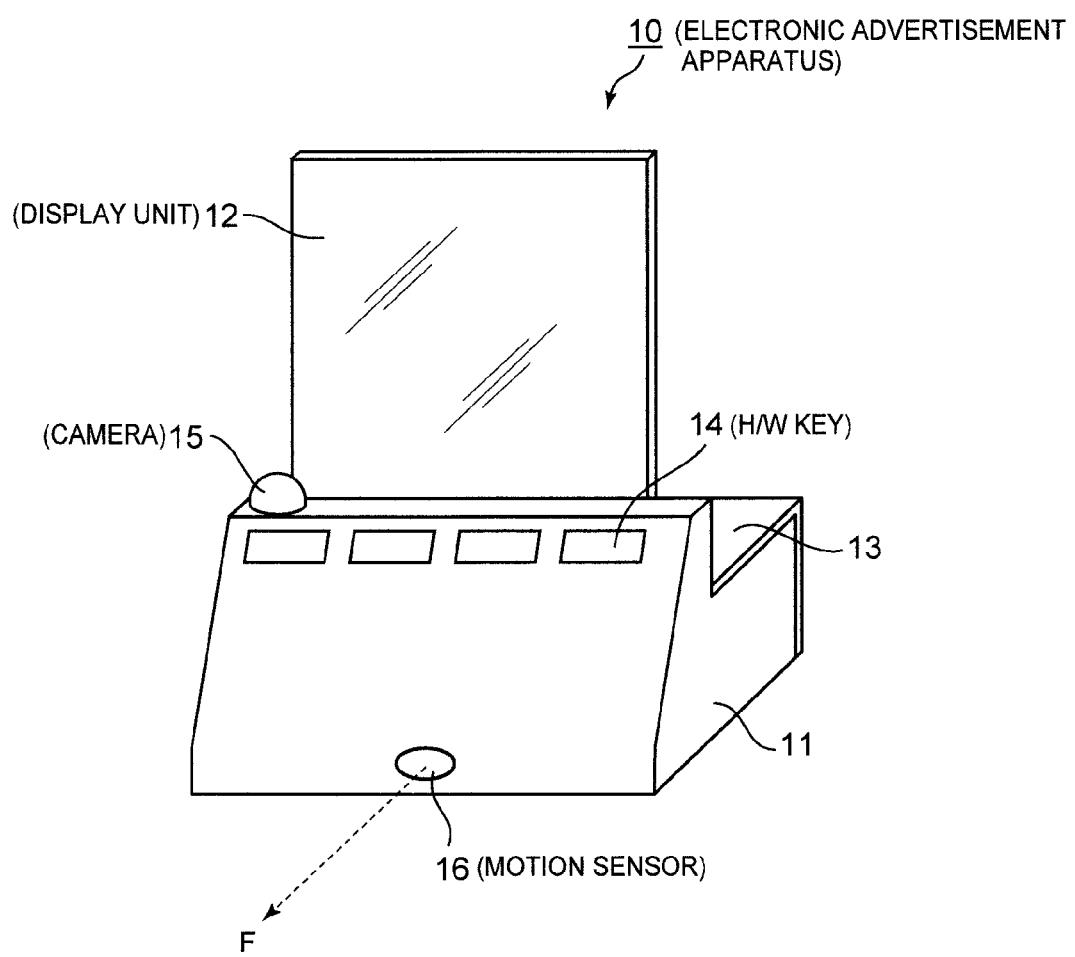
FIG. 1 is a front perspective view illustrating the external structure of an electronic advertisement apparatus 10 which is an embodiment of an information output apparatus according to the present invention.

FIG. 1 is a front perspective view illustrating the external structure of an electronic advertisement apparatus 10 which is an embodiment of an information output apparatus according to the present invention.

The electronic advertisement apparatus 10 has, for example, a stationary apparatus body 11 of about 30 cm to 40 cm in length, width, and height. A display unit 12 which is a rear projection screen is installed standing on the top of the body. An image such as an advertisement is projected onto the display unit 12 from an optical projection device 13 built in the back of the body.

The following components are disposed on the front side of the apparatus body 11: hardware (H/W) keys 14 for instructions of power on/off, advertisement reproduction designation/start/end, and the like; a camera 15 for capturing the environment of 360° around the body; and a motion sensor 16 for detecting the number of persons present in the front direction F of the body, i.e. the direction of image display by the display unit 12, and the distances to the persons.

Figure 2:
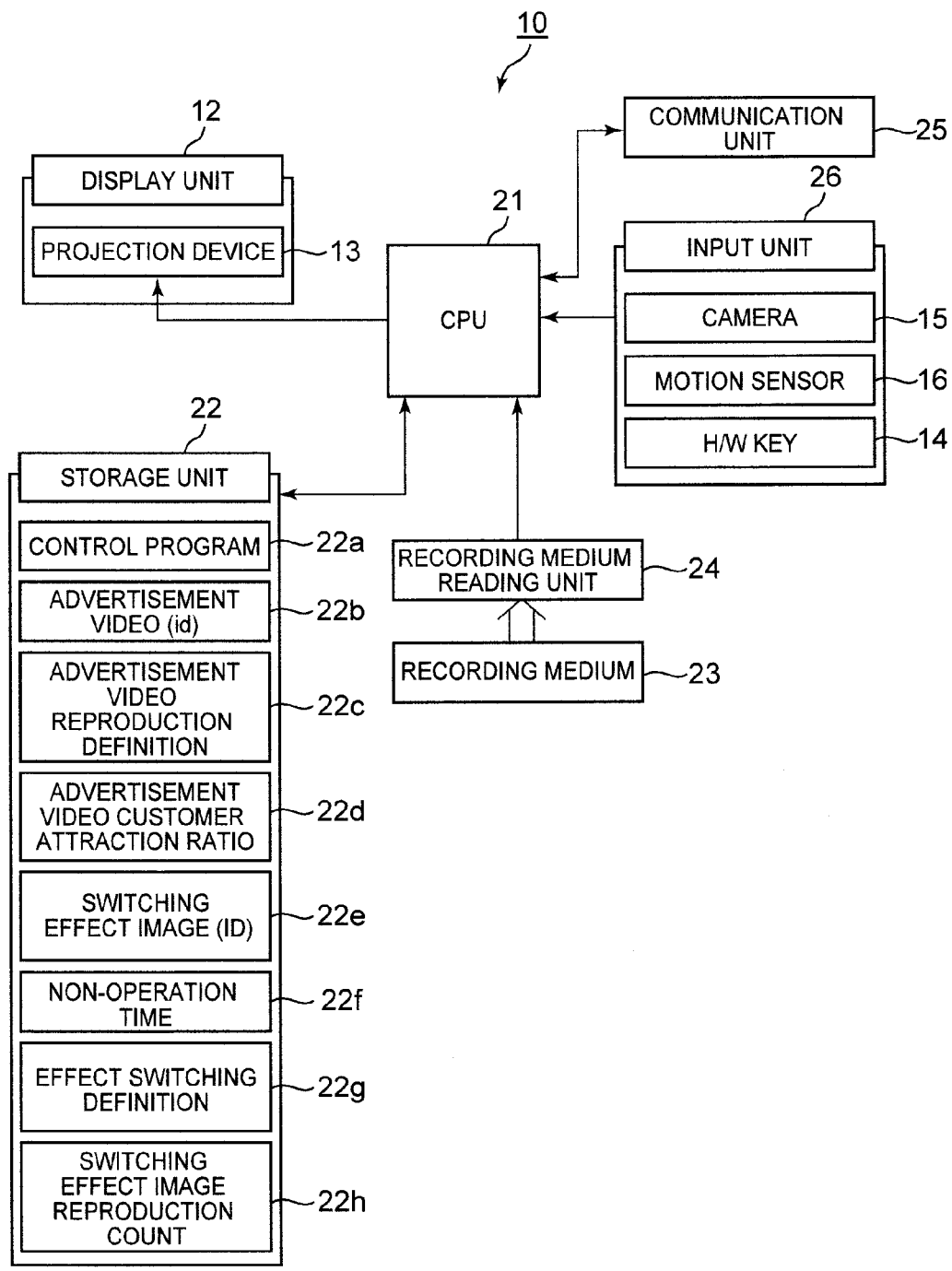
FIG. 2 is a block diagram illustrating the structure of electronic circuitry of the electronic advertisement apparatus 10.

FIG. 2 is a block diagram illustrating the structure of electronic circuitry of the electronic advertisement apparatus 10.

The electronic circuitry of the electronic advertisement apparatus 10 includes a CPU 21 which is a microcomputer.

The CPU 21 controls the operation of each circuit component according to an apparatus control program 22a, and executes various functions of the electronic advertisement apparatus 10 including an advertisement reproduction function. The apparatus control program 22a is a program stored beforehand in a storage unit 22 such as flash ROM, a program read from an external recording medium 23 such as a memory card into the storage device 22 via a recording medium reading unit 24, or a program downloaded from a program server (not illustrated) in a communication network into the storage device 22 via a communication unit 25.

The CPU 21 is connected to the projection device 13 including the display unit 12, an input unit 26 including the H/W keys 14, the camera 15, and the motion sensor 16, the storage unit 22, the recording medium reading unit 24, the communication unit 25, etc.

The storage unit 22 stores various data necessary for the process operation of the CPU 21. The storage unit 22 has an advertisement video storage area 22b, an advertisement video reproduction definition storage area 22c, an advertisement video customer attraction ratio storage area 22d, a switching effect image storage area 22e, a non-operation time storage area 22f, an effect switching definition storage area 22g, a switching effect image reproduction count storage area 22h, etc.

The advertisement video storage area 22b stores data of a plurality of advertisement videos produced beforehand, in association with their id numbers and advertisement names.

Figure 3:
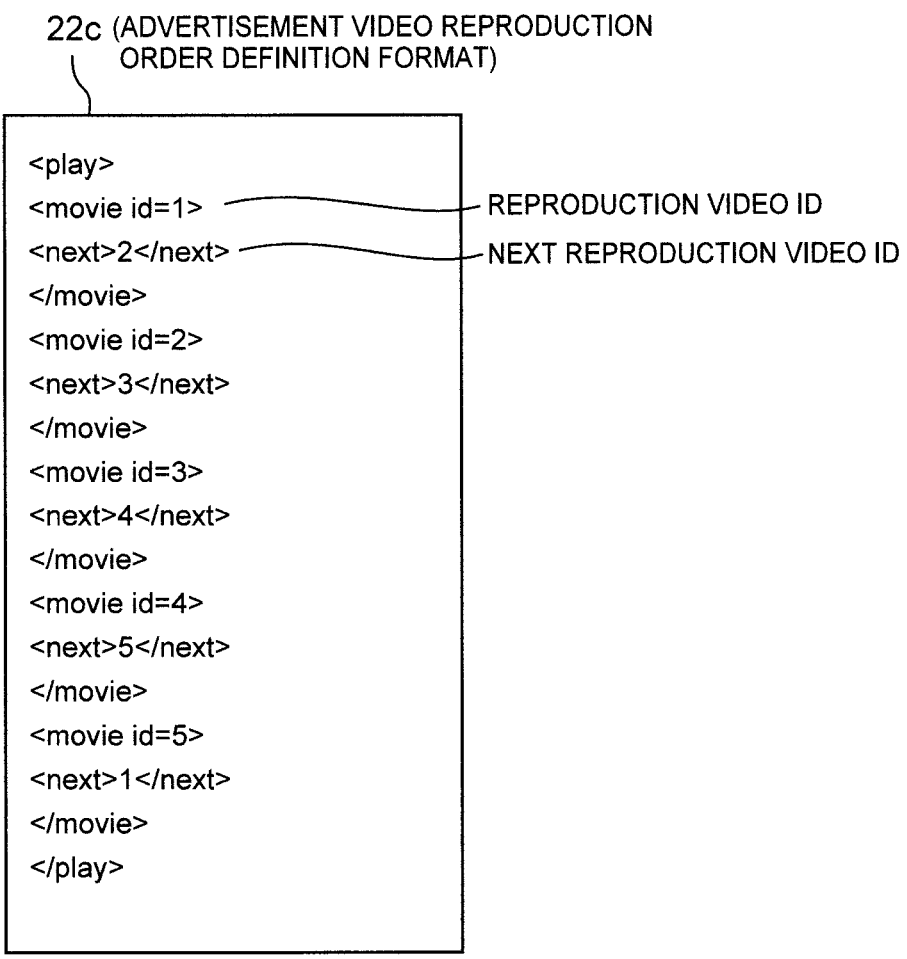
FIG. 3 is a diagram illustrating an advertisement video reproduction order definition format stored in an advertisement video reproduction definition storage area 22c in the electronic advertisement apparatus 10.

FIG. 3 is a diagram illustrating an advertisement video reproduction order definition format stored in the advertisement video reproduction definition storage area 22c in the electronic advertisement apparatus 10.

The advertisement video reproduction definition storage area 22c stores a format defining the reproduction order of the plurality of advertisement videos stored in the advertisement video storage area 22b according to the advertisement reproduction function of the electronic advertisement apparatus 10. In this format, one reproduction video ID and the next reproduction video ID are shown using the corresponding id numbers.

The advertisement video customer attraction ratio storage area 22d stores, in association with the id number of each of the plurality of advertisement videos stored in the advertisement video storage area 22b, the customer attraction ratio corresponding to the reproduction period of the advertisement video. The customer attraction ratio of the advertisement video is calculated as the total number of persons present within a fixed range around the electronic advertisement apparatus 10 on a 10-second basis, based on persons recognized from the image of the surrounding environment captured by the camera 15 and the number of persons and the distances to them detected by the motion sensor 16 during the reproduction period of the advertisement video.

The switching effect image storage area 22e stores data of a plurality of switching effect images each inserted and reproduced upon switching the reproduction of any advertisement video stored in the advertisement video storage area 22b, in association with their ID numbers set in descending order of noticeability. Each time the advertisement reproduction function of the electronic advertisement apparatus 10 is executed, the plurality of switching effect images are each generated as the newest and optimal switching effect image corresponding to the surrounding environment according to the switching effect preparation process included in the advertisement reproduction function.

Figure 4A:
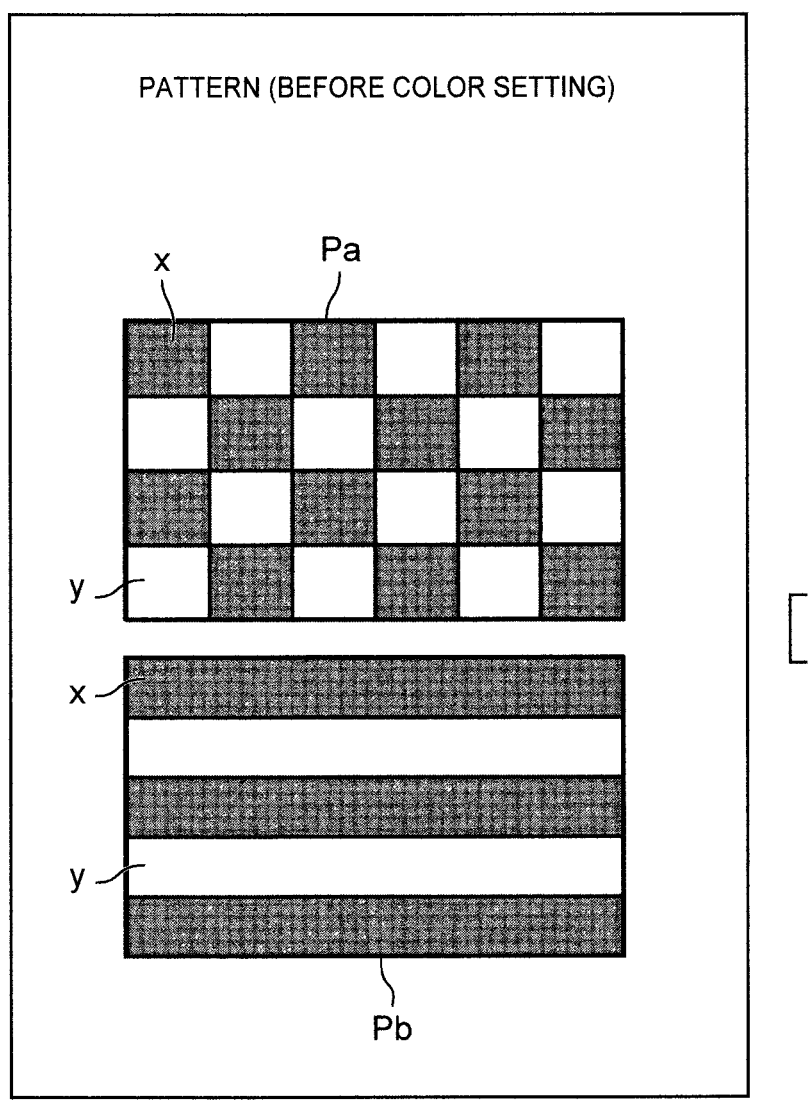
FIGS. 4A to 4C are diagrams illustrating (an example of) a switching effect image generation procedure according to a switching effect preparation process included in the advertisement reproduction function of the electronic advertisement apparatus 10.
Figure 4B:
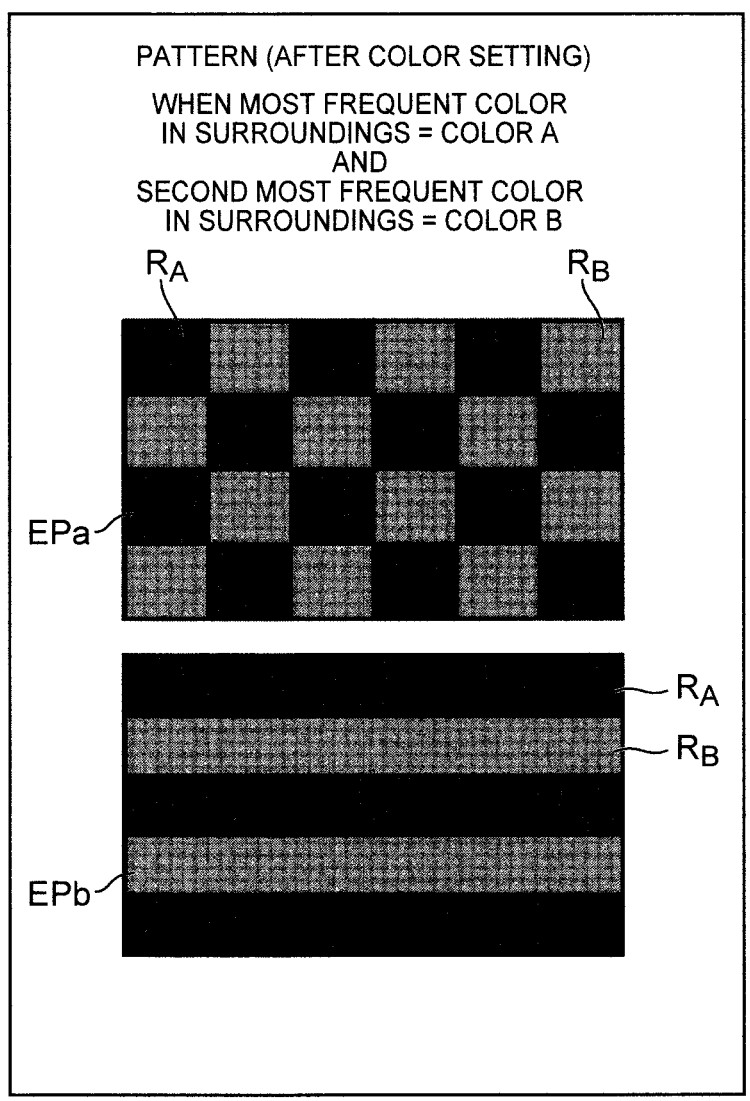
Figure 4C:
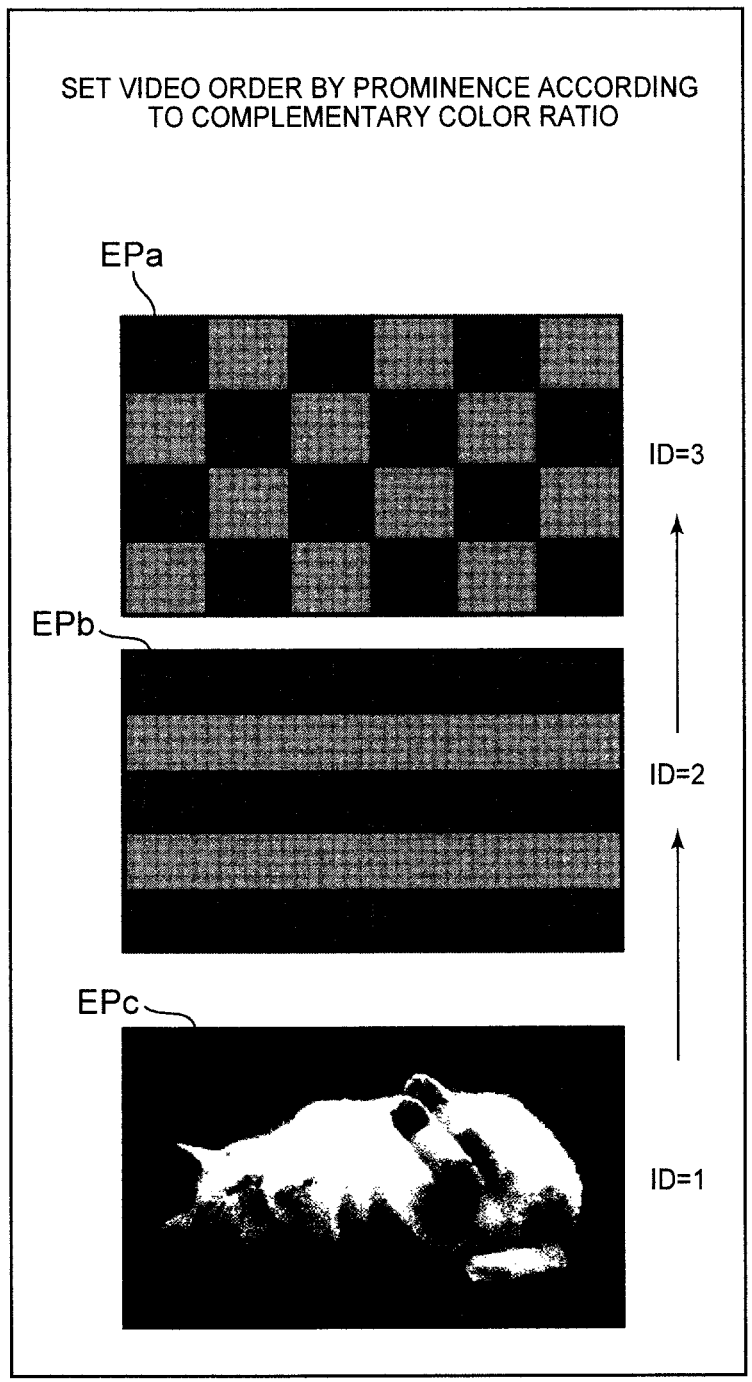

FIGS. 4A to 4C are diagrams illustrating (an example of) the switching effect image generation procedure according to the switching effect preparation process included in the advertisement reproduction function of the electronic advertisement apparatus 10.

For example, a plurality of switching effect patterns Pa, Pb, . . . each having coloration areas x and y in which two colors can be regularly arranged are prepared, as illustrated in FIG. 4A. Next, a complementary color RA of the most frequent color (color A) and a complementary color RB of the second most frequent color (color B) in the surrounding environment are set respectively in the coloration areas x and y in the switching effect patterns Pa, Pb, . . . to generate a plurality of switching effect images EPa, EPb, . . . , as illustrated in FIG. 4B. The generated switching effect images EPa, EPb, . . . in addition to any switching effect image (video) EPc, . . . are then assigned ID numbers in descending order of the ratio of the first complementary color RA (in descending order of noticeability in the surrounding environment), as illustrated in FIG. 4C. The plurality of switching effect images EPa, EPb, EPc, . . . generated in this way are stored in the switching effect image storage area 22e.

The non-operation time storage area 22f stores the duration of the state in which there is no advertisement designation key input using the H/W keys 14 and there is no person recognized based on the image captured by the camera 15 or the motion sensor 16 in the advertisement reproduction period according to the advertisement reproduction function of the electronic advertisement apparatus 10. Here, the duration is measured and stored as non-operation time during which the advertisement reproduction receives no attention.

Figures 5, 6:
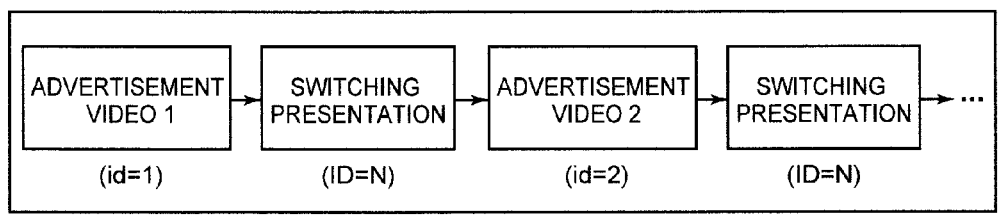
FIG. 5 is a diagram illustrating a switching effect image switching definition format stored in an effect switching definition storage area 22g in the electronic advertisement apparatus 10.
FIG. 6 is a diagram illustrating an advertisement video reproduction procedure by the electronic advertisement apparatus 10.

FIG. 5 is a diagram illustrating a switching effect image switching definition format stored in the effect switching definition storage area 22g in the electronic advertisement apparatus 10.

The effect switching definition storage area 22g stores a format defining, upon switching the reproduction of each of the plurality of advertisement videos stored in the advertisement video storage area 22b, which switching effect image EP from among the plurality of switching effect images EPa, EPb, EPc, . . . stored in the switching effect image storage area 22e the reproduction is switched to. The format uses, for example, flag levels <flag level=0; 0~14 min>, <flag level=1; 15~29 min>, <flag level=2; 30~59 min>, <flag level=3; 60~119 min>, and <flag level=4; 120 min~> by classifying the non-operation time into 5 levels. In this embodiment, the format is defined so as to switch to a more noticeable switching effect image EP from among the switching effect images EP when the non-operation time is longer. Hence, the switching effect image EP of ID=1 is reproduced when flag level=4, the switching effect image EP of ID=2 is reproduced when flag level=3, the switching effect image EP of ID=3 is reproduced when flag level=2, the switching effect image EP of ID=4 is reproduced when flag level=1, and the switching effect image EP of ID=5 is reproduced when flag level=0.

In addition, a maximum reproduction count limit <max_play 70> common to the switching effect images EPa, EPb, EPc, . . . is defined in the effect switching definition storage area 22g. In the case where the reproduction count of the switching effect image EP determined according to the flag level <flag level=0~4> of the non-operation time exceeds the maximum reproduction count limit <max_play 70>, the advertisement video with the highest customer attraction ratio stored in the advertisement video customer attraction ratio storage area 22d is reproduced as the switching effect image.

The switching effect image reproduction count storage area 22h stores the counted number of reproductions of each of the switching effect images EPa, EPb, EPc, . . . stored in the switching effect image storage area 22e.

FIG. 6 is a diagram illustrating the advertisement video reproduction procedure by the electronic advertisement apparatus 10.

In detail, the electronic advertisement apparatus 10 reproduces the plurality of advertisement videos stored in the advertisement video storage area 22b, according to the reproduction order defined in the advertisement video reproduction definition storage area 22c. Here, each time one advertisement video is switched to another, one of the plurality of switching effect images EPa, EPb, EPc, . . . stored in the switching effect image storage area 22e is selected and reproduced according to the flag level <flag level=0~4> of the non-operation time defined in the effect switching definition storage area 22g.

The electronic advertisement apparatus 10 having the foregoing structure realizes various functions in the operation described below, by the CPU 21 controlling the operation of each circuit component according to instructions of various processes written in the apparatus control program 22*a* so that software and hardware operate in cooperation.

The following describes the operation of the electronic advertisement apparatus 10 having the foregoing structure.

FIG. 7 is a flowchart illustrating the advertisement reproduction process by the electronic advertisement apparatus 10.

FIG. 8 is a flowchart illustrating the switching effect preparation process in the advertisement reproduction process by the electronic advertisement apparatus 10.

FIG. 9 is a flowchart illustrating the switching effect ID acquisition process in the advertisement reproduction process by the electronic advertisement apparatus 10.

When the user operates the H/W keys 14 to instruct the electronic advertisement apparatus 10 to start advertisement reproduction, the CPU 21 starts the advertisement reproduction process in FIG. 7 according to the apparatus control program 22*a*. The switching effect preparation process in FIG. 8 is performed first (step SA).

In the switching effect preparation process, the surrounding environment of 360° is captured by the camera 15 (step A1), and the most frequent color (color A) and the second most frequent color (color B) are acquired from the captured image of the surrounding environment (steps A2 and A3).

Next, the complementary color RA of the most frequent color (color A) and the complementary color RB of the second most frequent color (color B) acquired from the image of the surrounding environment are set respectively in the coloration areas x and y of the two colors in each of the switching effect patterns Pa, Pb, . . . prepared beforehand in the switching effect image storage area 22*e* as illustrated in FIG. 4A. The plurality of switching effect images EPa, EPb, . . . are thus generated as illustrated in FIG. 4B (step A4).

The generated switching effect images EPa, EPb, . . . and any switching effect image (video) EPc . . . added by the user are assigned ID numbers in descending order of the ratio of the first complementary color RA, as illustrated in FIG. 4C (step A5).

As a result, the plurality of switching effect images EPa (ID=3), EPb (ID=2), EPc (ID=1), . . . associated with the ID numbers are prepared in the switching effect image storage area 22*e*. Following this, the id number (the first advertisement video id=1 in this example) of the advertisement video to be reproduced is acquired according to the advertisement video reproduction order (see FIG. 3) defined in the advertisement video reproduction definition storage area 22*c* (step S1).

The advertisement video data corresponding to the acquired advertisement video id=1 is read from the advertisement video storage area 22*b*, and projected onto the display unit 12 by the projection device 13 and reproduced (steps S2 and S3).

After the reproduction of the advertisement video (id=1) ends (step S4), the id number (the advertisement video id=2 in this example) of the advertisement video to be reproduced next is acquired according to the advertisement video reproduction order (see FIG. 3) defined in the advertisement video reproduction definition storage area 22*c* (step S5).

The latest non-operation time from the advertisement reproduction start, which is stored in the non-operation time storage area 22*f*, is then acquired (step S6), and the switching effect ID acquisition process in FIG. 9 is performed (step SB).

In the switching effect ID acquisition process, the flag level <flag level> (see FIG. 5) defined in the effect switching definition storage area 22*g* and corresponding to the latest non-operation time from the advertisement reproduction start acquired in step S6 is acquired (steps B1 and B2).

The ID number of the switching effect image EP corresponding to the acquired flag level <flag level> of the non-operation time is then acquired (step B3).

In detail, in the case where the non-operation time is 20 minutes, the flag level is <flag level=1>, and the switching effect image ID (=4) is acquired.

Here, the reproduction count from the advertisement reproduction start stored in the switching effect image reproduction count storage area 22*h* is acquired for the switching effect image EP stored in the switching effect image storage area 22*e* in association with the acquired switching effect image ID (=4). Whether or not the acquired reproduction count is less than or equal to the maximum reproduction count limit <max_play 70> defined in the effect switching definition storage area 22*g* is determined (step B4).

In the case of determining that the reproduction count of the switching effect image EP corresponding to the switching effect image ID (=4) is less than or equal to the maximum reproduction count limit <max_play 70> (step B4: Yes), the image ID (=4) is set as the image ID of the image to be reproduced for the switching effect.

In the case of determining that the reproduction count of the switching effect image EP corresponding to the switching effect image ID (=4) exceeds the maximum reproduction count limit <max_play 70> (step B4: No), the advertisement video id with the highest customer attraction ratio stored in the advertisement video customer attraction ratio storage area 22*d* is set as the image ID of the image to be reproduced for the switching effect (step B5).

Hence, the switching effect image EP (or advertisement video) corresponding to the set image ID is read from the switching effect image storage area 22*e* (or the advertisement video storage area 22*b*), and projected onto the display unit 12 by the projection device 13 and reproduced (step S7).

After the reproduction of the switching effect image EP (or advertisement video) corresponding to the image ID of the image for the switching effect ends (step S8), whether or not the electronic advertisement apparatus 10 is instructed to end the advertisement reproduction by, for example, a user operation on the H/W keys 14 is determined (step S9). In the case of determining that the electronic advertisement apparatus 10 is not instructed to end the advertisement reproduction (step S9: No), the advertisement video data corresponding to the advertisement video id (=2) to be reproduced next, which is acquired in step S5, is read from the advertisement video storage area 22*b* and its reproduction starts (steps S2 and S3).

The same operation is subsequently repeated. In detail, each advertisement video stored in the advertisement video storage area 22*b* is reproduced according to the advertisement video reproduction order (see FIG. 3) defined in the advertisement video reproduction definition storage area 22*c*. Upon switching each individual advertisement video, the switching effect image EP stored in the switching effect image storage area 22*e* and corresponding to the latest non-operation time stored in the non-operation time storage area 22*f* is set and reproduced, based on the flag level <flag level> of the non-operation time defined in the effect switching definition storage area 22*g* (steps S2 to S9).

Thus, with the advertisement reproduction function of the electronic advertisement apparatus 10 having the foregoing structure, the plurality of advertisement videos (id=1, 2, . . . ) stored in the advertisement video storage area 22b are projected onto the display unit 12 from the projection device 13 and reproduced, according to the definition of the advertisement video reproduction order stored in the advertisement video reproduction definition storage area 22c. Upon switching the reproduction of each advertisement video, from among the plurality of switching effect images EP (ID=1, 2, . . . ) that are assigned the ID numbers in descending order of noticeability against the surrounding environment, i.e. in descending order of the complementary color ratio, and stored in the switching effect image storage area 22e, an image ID associated with higher noticeability is set when the non-operation time (the time during which no person is detected around the apparatus body 11) from the advertisement video reproduction start is longer. This non-operation time is measured and stored in the non-operation time storage area 22f. The switching effect image EP corresponding to the image ID is then reproduced.

In this way, at the timing of switching each reproduced advertisement video, a switching effect image EP more noticeable against the surrounding environment is reproduced when the immediately previous non-operation time during which no person is detected around the apparatus body 11, i.e. during which the advertisement video receives no attention, is longer. This increases viewers' attention to the advertisement video.

Moreover, with the advertisement reproduction function of the electronic advertisement apparatus 10 having the foregoing structure, the plurality of switching effect images EP are generated in the following manner: The most frequent color (color A) and the second most frequent color (color B) are acquired from the image of the surrounding environment captured by the 360° camera 15, and the complementary color RA of the most frequent color (color A) and the complementary color RB of the second most frequent color (color B) are set respectively in the coloration areas x and y of the two colors in the switching effect patterns Pa, Pb, . . . prepared beforehand.

Hence, the optimal switching effect images EP noticeable against the surrounding environment of the installation location of the electronic advertisement apparatus 10 can be generated according to the location. This increases viewers' attention to the advertisement video irrespective of the location of the apparatus body 11.

Furthermore, with the advertisement reproduction function of the electronic advertisement apparatus 10 having the foregoing structure, the duration of the state in which there is no advertisement designation key input using the H/W keys 14 and there is no person recognized based on the image of the surrounding environment captured by the camera 15 or the motion sensor 16 is measured as the non-operation time during which the reproduced advertisement video receives no attention.

The non-operation time during which the reproduced advertisement video receives no attention can be acquired appropriately in this way. The switching effect image EP with optimal noticeability can then be set according to the non-operation time during which the advertisement video receives no attention. This increases viewers' attention to the advertisement video.

In the above embodiment, depending on the non-operation time measured as the duration of the state in which there is no person around the apparatus body 11, the switching effect image EP more noticeable against the surrounding environment when the non-operation time is longer is set from among the plurality of switching effect images EP and reproduced. Alternatively, the distance from the apparatus body 11 to any person around the apparatus body 11 may be acquired based on the image data of the surrounding environment captured by the 360° camera 15 or the data detected by the motion sensor 16. In this case, the switching effect image EP more noticeable against the surrounding environment when the distance to the person is longer is set from among the plurality of switching effect images EP and reproduced. This increases viewers' attention to the advertisement video as in the embodiment.

Although the switching effect images are generated in the above embodiment, the present invention is not limited to such. The switching effect images may be selected from switching effect images stored beforehand.

Although the electronic advertisement apparatus 10 reproduces advertisement video in the above embodiment, the present invention is not limited to such. The electronic advertisement apparatus 10 may reproduce audio, or content other than advertisement video or audio.

Besides, the switching effect is not limited to images, and may involve sounds or the like.

The methods of processes and databases in the electronic advertisement apparatus 10 described in the embodiment may all be stored in the external recording device medium (23) such as a memory card (ROM card, RAM card, etc.), a magnetic disk (floppy disk, hard disk, etc.), an optical disc (CD-ROM, DVD, etc.), or semiconductor memory and distributed, as a program executable by a computer. These methods of processes and databases include: the methods of processes such as the advertisement reproduction process illustrated in the flowchart in FIG. 7, the switching effect preparation process in the advertisement reproduction process illustrated in the flowchart in FIG. 8, and the switching effect ID acquisition process in the advertisement reproduction process illustrated in the flowchart in FIG. 9; and the databases such as the advertisement video data stored in the advertisement video storage area 22b, the advertisement video reproduction order definition format stored in the advertisement video reproduction definition storage area 22c, and the switching effect image switching definition format stored in the effect switching definition storage area 22g. The computer (21) of the electronic equipment including the surrounding environment recognition device (15, 16) and the display unit (12) may read the program stored in the external recording device medium (23) into the storage device (22) and control the operation according to the read program, thus realizing the advertisement reproduction function with the switching effect described in the embodiment and executing the same processes by the above-mentioned methods.

The data of the program for realizing each of the above-mentioned methods may be transmitted through the communication network in the form of program code. The data of the program may then be downloaded from a computer device (program server) connected to the communication network into the electronic equipment including the surrounding environment recognition device (15, 16) and the display unit (12) and stored in the storage device (22), thus realizing the advertisement reproduction function with the switching effect.

The present invention is not limited to the above embodiment, and various changes are possible without departing from the scope of the invention in the implementation stage. Further, the embodiment includes inventions at various stages, and various inventions can be extracted by properly combining a plurality of constituent features disclosed herein. For example, in the case where the problem stated in the summary of the invention can be solved and the advantageous effect stated in the summary of the invention can be achieved even when some of the constituent features described in the embodiment are omitted or combined as a different embodiment, such omissions or combinations of constituent features can also be extracted as inventions.

What is claimed is:

1. An information output apparatus comprising:
a content output unit configured to output content;
a person state detection unit configured to detect a person presence state; and
a control unit configured to control a content switching effect based on the person presence state detected by the person state detection unit, when switching the content output by the content output unit,
wherein the control unit is configured to:
generate a plurality of switching effect images having high degrees of attention against a surrounding environment;
select, from the plurality of switching effect images, a switching effect image according to the person presence state detected by the person state detection unit and cause the selected switching effect image to be displayed, when switching the content, and
generate the plurality of switching effect images having the high degrees of attention, by including a complementary color of a frequent color that is acquired from a captured image of the surrounding environment.

2. The information output apparatus according to claim 1, comprising
a storage unit configured to store the plurality of content switching effects.

3. An information output apparatus, comprising:
a content output unit configured to output content;
a person state detection unit configured to detect a person presence state; and
a control unit configured to control a content switching effect based on the person presence state detected by the person state detection unit, when switching the content output by the content output unit,
wherein the control unit is configured to:
generate a plurality of switching effect images having high degrees of attention against a surrounding environment;
select, from the plurality of switching effect images, a switching effect image according to the person presence state detected by the person state detection unit and cause the selected switching effect image to be displayed, when switching the content,
rank the plurality of switching effect images by the degrees of attention; and
select, from the plurality of switching effect images, a higher ranked switching effect image when a degree of person presence detected by the person state detection unit is lower and cause the selected switching effect image to be displayed, when switching the content, and
wherein the person state detection unit is configured to detect the degree of person presence as duration for which no person is present, and
wherein the control unit is configured to select, from the plurality of switching effect images, the higher ranked switching effect image when the duration for which no person is present is longer and cause the selected switching effect image to be displayed, when switching the content.

4. An information output apparatus, comprising:
a content output unit configured to output content;
a person state detection unit configured to detect a person presence state; and
a control unit configured to control a content switching effect based on the person presence state detected by the person state detection unit, when switching the content output by the content output unit,
wherein the control unit is configured to:
generate a plurality of switching effect images having high degrees of attention against a surrounding environment;
select, from the plurality of switching effect images, a switching effect image according to the person presence state detected by the person state detection unit and cause the selected switching effect image to be displayed, when switching the content,
rank the plurality of switching effect images by the degrees of attention; and
select, from the plurality of switching effect images, a higher ranked switching effect image when a degree of person presence detected by the person state detection unit is lower and cause the selected switching effect image to be displayed, when switching the content, and
wherein the person state detection unit is configured to detect the degree of person presence as a distance to a person present, and
wherein the control unit is configured to select, from the plurality of switching effect images, the higher ranked switching effect image when the distance to the person present is longer and cause the selected switching effect image to be displayed, when switching the content.

5. A nontransitory medium readable by a computer having an output unit; and a person state detection unit configured to detect a person presence state, the nontransitory medium containing instruction causing the computer to:
execute a content output process of outputting content by the output unit;
execute a control process of controlling a content switching effect based on the person presence state detected by the person state detection unit, when switching the content output in the content output process;
generate a plurality of switching effect images having high degrees of attention against a surrounding environment;
select, from the plurality of switching effect images, a switching effect image according to the person presence state detected by the person state detection unit and cause the selected switching effect image to be displayed, when switching the content, and
generate the plurality of switching effect images having the high degrees of attention, by including a complementary color of a frequent color that is acquired from a captured image of the surrounding environment.

6. A nontransitory medium readable by a computer having an output unit; and a person state detection unit configured to detect a person presence state, the nontransitory medium containing instruction causing the computer to:
execute a content output process of outputting content by the output unit;
execute a control process of controlling a content switching effect based on the person presence state detected by the person state detection unit, when switching the content output in the content output process;

generate a plurality of switching effect images having high degrees of attention against a surrounding environment;

select, from the plurality of switching effect images, a switching effect image according to the person presence state detected by the person state detection unit and cause the selected switching effect image to be displayed, when switching the content, rank the plurality of switching effect images by the degrees of attention; and select, from the plurality of switching effect images, a higher ranked switching effect image when a degree of person presence detected by the person state detection unit is lower and cause the selected switching effect image to be displayed, when switching the content, and wherein the person state detection unit is configured to detect the degree of person presence as a distance to a person present, and wherein the control unit is configured to select, from the plurality of switching effect images, the higher ranked switching effect image when the distance to the person present is longer and cause the selected switching effect image to be displayed, when switching the content.

7. A nontransitory medium readable by a computer having an output unit; and a person state detection unit configured to detect a person presence state, the nontransitory medium containing instruction causing the computer to:

generate a plurality of switching effect images having high degrees of attention against a surrounding environment;

select, from the plurality of switching effect images, a switching effect image according to the person presence state detected by the person state detection unit and cause the selected switching effect image to be displayed, when switching the content, rank the plurality of switching effect images by the degrees of attention; and select, from the plurality of switching effect images, a higher ranked switching effect image when a degree of person presence detected by the person state detection unit is lower and cause the selected switching effect image to be displayed, when switching the content, and wherein the person state detection unit is configured to detect the degree of person presence as a distance to a person present, and wherein the control unit is configured to select, from the plurality of switching effect images, the higher ranked switching effect image when the distance to the person present is longer and cause the selected switching effect image to be displayed, when switching the content.

* * * * *